United States Patent [19]

Millard

[11] Patent Number: 5,325,229

[45] Date of Patent: Jun. 28, 1994

[54] TEMPERATURE CONTROL OF CRYSTALS USED IN OPTICAL OSCILLATORS

[75] Inventor: Wayne A. Millard, Bartlesville, Okla.

[73] Assignee: Phillips Petroleum Company, Bartlesville, Okla.

[21] Appl. No.: 58,333

[22] Filed: May 10, 1993

[51] Int. Cl.[5] ............................................. G02F 1/39
[52] U.S. Cl. .................................. 359/330; 219/389; 219/490; 219/501; 236/1 F
[58] Field of Search ........................ 359/326–330; 236/1 C, 1 F, 15 BF; 219/209, 210, 385, 389, 482, 488, 490, 494, 501

[56] References Cited

U.S. PATENT DOCUMENTS 3,621,213 11/1971 Jen et al. ............................. 364/477
3,675,039 7/1972 Boyd et al. ......................... 307/88.3
4,348,115 9/1982 Walker et al. ...................... 356/436

*Primary Examiner*—John D. Lee
*Attorney, Agent, or Firm*—George E. Bogatie

[57] ABSTRACT

A crystal, which is mounted in a rotatable support for use in tuning the wavelength of an optical parametric oscillator, is maintained at a desired temperature by positioning a heating sleeve to thermally coupled to the crystal and its support in such a way that the crystal is still free to rotate. The heating sleeve has an embedded heating element for connecting to an electronic controller whose dynamic output response matches the dynamic temperature characteristics of the combination of components including the crystal, it rotatable holder and the heating sleeve, so as to quickly stabilize changes in the crystal temperature with a minimum amount of overshoot.

15 Claims, 7 Drawing Sheets

TEMPERATURE CONTROL OF CRYSTALS USED IN OPTICAL OSCILLATORS

This invention relates to temperature control within a range of temperature suitable for measurement by a thermistor. More specifically it relates to a method and apparatus for precise temperature control of a crystal employed in an analytical instrument used to probe the earth's atmosphere for the presence of gaseous molecules of interest.

BACKGROUND OF THE INVENTION

The application of coherent optical devices operating in the region of the infrared spectrum from about 3 to about 5 micrometers has proven useful in environmental monitoring. These instruments, in which a laser generates intense infrared pulses in beam widths as small as 30 seconds of arc, measure concentration of gaseous molecules in the earth's atmosphere by radar techniques. Unfortunately these lasers are not tunable over broad ranges.

An optical parametric oscillator (OPO) using an optically nonlinear lithium niobate crystal has proven to be practical for tuning the wavelength of the coherent optical instrument. The lithium niobate crystal in the OPO is employed as the interaction medium for tuning and is pumped by a laser operating substantially at 1.064 micrometers in the infrared in a direction substantially normal to the optic axis of the crystal to produce infrared light in the 3-5 micrometer range. The wavelength is turned by adjusting the mechanical angle theta $\theta$, at which the incoming laser light strikes the crystal, by rotating the crystal about an appropriate axis. Tuning of the wavelength can also be achieved by varying the temperature of the OPO crystal. It should be appreciated by those skilled in the art, however, that in a singly resonant oscillator only one tuning technique is desired.

Accordingly, it is an object of this invention to precisely control the temperature of the OPO crystal so that tunable oscillations in the optically generated wavelength can be provided by rotating the crystal about an appropriate axis.

Another object of this invention is to provide a coherent optical device having minimal error resulting from temperature variation.

Another object of this invention is to provide a temperature controller for a crystal mounted in a rotatable support which anticipates correction of an error by sensing the rate of change of the error and providing a corresponding correction.

Other objects of the present invention will be apparent to those of ordinary skill in the art from the following disclosure taken together with the drawings in which.

SUMMARY OF THE INVENTION

In accordance with this invention, I have discovered that precise control of the temperature of a crystal mounted in a rotatable support can be achieved by providing a heating sleeve having an embedded heating element, wherein the sleeve slides over the crystal mounted in its support and thermally couples to the crystal and support in such a way that the crystal is still free to rotate. An electronic controller is connected to the heating element and then the dynamic response of the output of the electronic controller is matched to the dynamic temperature characteristics of the combination of components including the heating sleeve, the crystal and its rotatable support.

In a preferred embodiment the controller comprises a voltage comparator section, a voltage gain section, and a power amplifier section which supplies current to the heating element embedded in the heating sleeve. The comparator and voltage gain sections are coupled through a compensating lead network whose output is proportional to the sum of its input signal and its derivative. Accordingly the lead network acts in an anticipatory fashion, since the current through it is a function of a derivative, i.e. how rapidly the temperature is changing. The effect of the lead network is to turn the heating element off prior to the final temperature being reached. The time constant of the lead network is experimentally matched to characteristics of the sleeve by making the time constant of the lead network essentially equal to the time constant for the crystal temperature to respond to the heating current. Accordingly the controller quickly stabilizes changes or disturbances in the crystal temperature with a minimum amount of overshoot.

DETAILED DESCRIPTION OF THE PREFERRED EMBODIMENT

Figure 1:
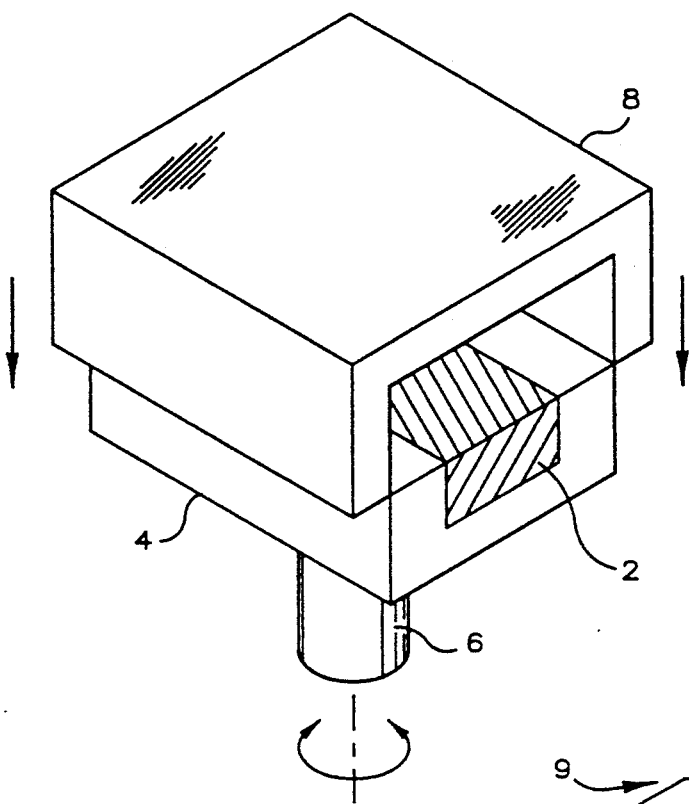
FIG. 1 is a perspective view of a lithium niobate crystal in a rotatable support and partially covered by a heating sleeve.

Referring to FIG. 1, the invention is described in terms of a crystal 2 which is critical component in an optical parametric oscillator (OPO) used to generate infrared light in the 3-5 micrometer range. For mounting in an OPO, the crystal is held in a mechanical support 4 that is connected to an angular drive 6 for rotating the crystal about an axis. A generally rectangular heating sleeve having a slot for mating with three sides of the rotatable mechanical support 4, which contains the crystal 2, is illustrated as 8. Since characteristics of low mass and high thermal conductivity are desired for the sleeve 8, a construction material of aluminum is preferred.

Figure 2A:
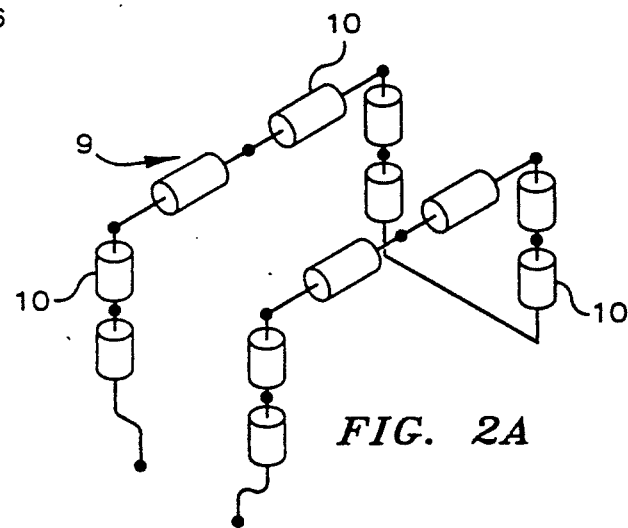
FIG. 2A shows an arrangement of resistors according to a preferred embodiment of this invention.
Figure 2B:
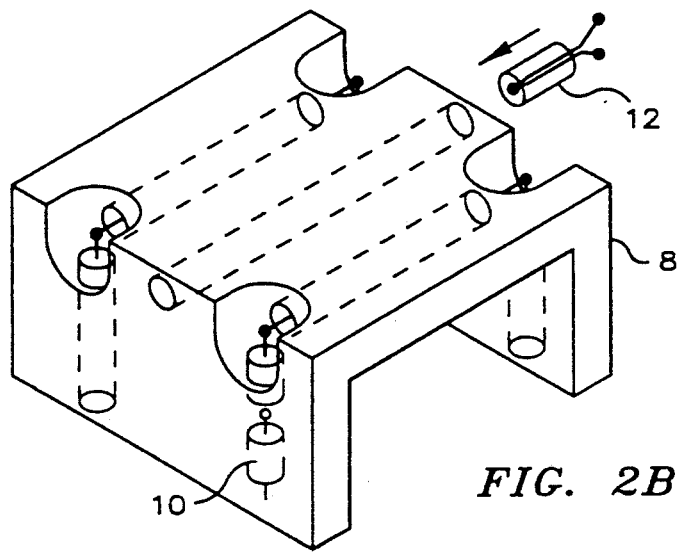
FIG. 2B shows the resistors of FIG. 2A mounted in the heating sleeve according to a preferred embodiment of this invention.

Any suitable heating element can be embedded in the sleeve 8 for supplying heat to the crystal. However, referring now to FIG. 2A, there is illustrated an arrangement of electrical resistors 10 which can conveniently be used as a heating element. This resistor heating element, generally indicated at 9 in FIG. 2A, can be embedded in the sleeve 8 as illustrated in FIG. 2B. In a preferred embodiment the resistor heating element comprises twelve series connected ¼ watt, 3.9 ohm carbon film resistors. Also preferably embedded in the sleeve 8 is a thermistor 12. Highly thermal conductive paste can be used between the sleeve and the crystal to improve heat flow. The temperature of the heating sleeve is preset by selecting resistance values of the embedded thermistor 12 and a reference resistor as will be more fully explained hereinafter. Since the sleeve has means only for heating, the preset temperature selected should be above ambient temperature so that natural cooling effects can be relied on to effect cooling without the need of using an active cooling device.

Figure 3:
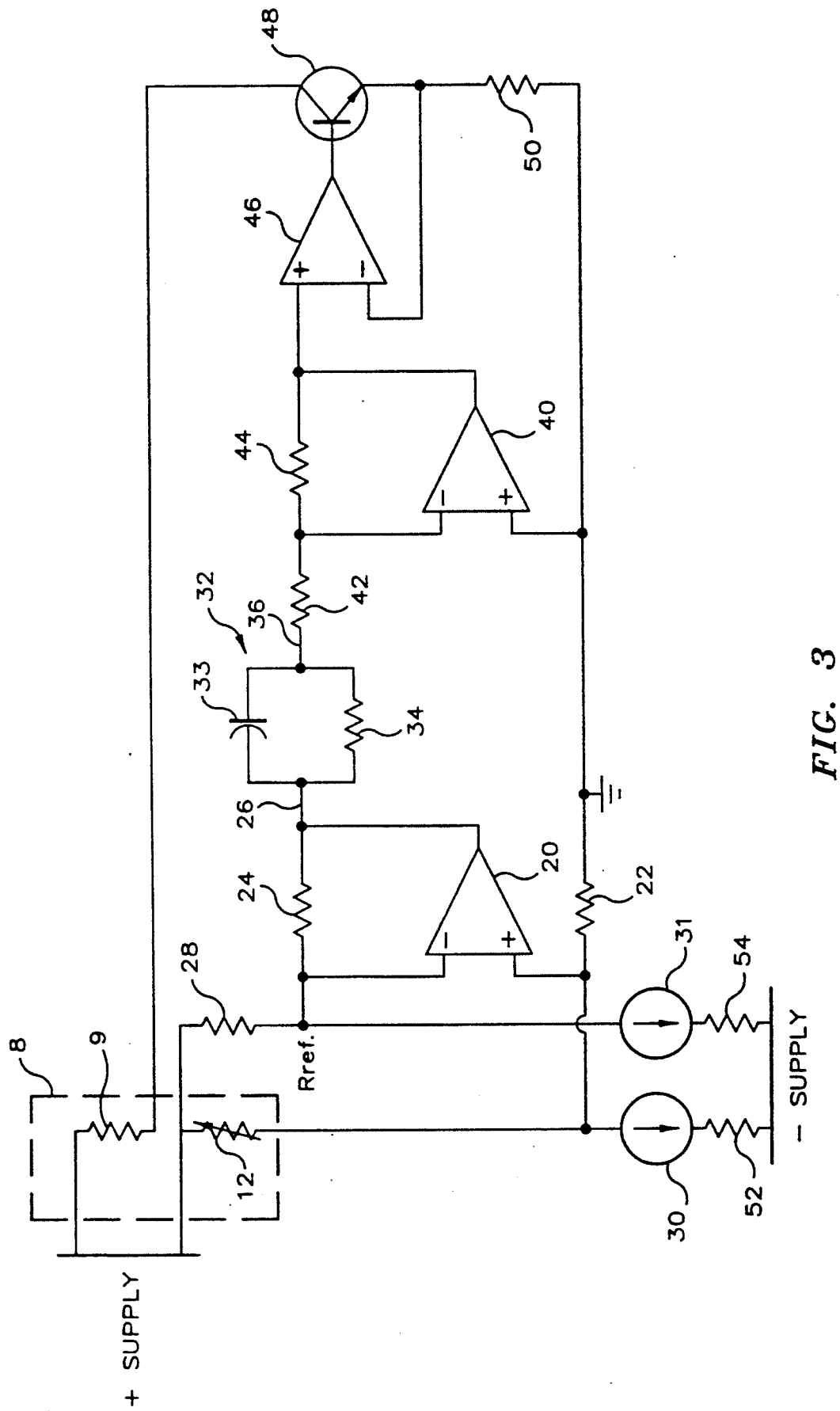
FIG. 3 is a simplified schematic of the controller electronics in accordance with a preferred embodiment of this invention.

Referring now to FIG. 3, there is illustrated a simplified schematic of the electronics for a controller which is suitable for manipulating current flow in the heating element 9 embedded in the heating sleeve 8 so as to maintain a constant temperature for the heating sleeve 8 and correspondingly the crystal 2. The voltage comparison section, which comprises operational amplifier 20 and resistors 22 and 24, is a balanced subtraction circuit having an output 26 which is zero when the resistance of the thermistor 12 is exactly equal to the resistance of the reference resistor 28. As previously mentioned the control temperature for the crystal is preset to a value above ambient temperature by selecting appropriate resistance values for thermistor 12 and reference resistor 28. Constant current for energizing the thermistor 12 and the reference resistor 28 is provided in a conventional manner by constant current sources 30 and 31. An example of resistance values selected for a prototype unit constructed in accordance with this invention include a thermistor having a resistance of 10 kohms at 25° C. and a precision reference resistor having a value of 7.169 kohms.

The output 26 of the voltage comparator circuit is presented to a lead circuit generally indicated at 32. The lead circuit includes capacitor 33 and resistor 34 arranged in parallel. The output 36 of the lead circuit carries a voltage equal to the sum of its input voltage and its derivative. As previously stated, the time constant of the lead network can be matched to the time constant for the temperature of the crystal to respond to the heating current so that the temperature of the crystal quickly stabilizes with a minimum amount of overshoot.

The voltage gain section of the controller comprises operational amplifier 40 and resistors 42 and 44 connected in a conventional configuration. Still referring to FIG. 3, a power amplifier including operational amplifier 46, power transistor 48, and a resistor 50 drives the heating element 9 which is embedded in the heating sleeve 8. Any suitable amount of power required may be delivered to the heating element 9, depending primarily on the exact temperature that is desired to be maintained and the mass of material to be heated. It was found that for an aluminum heating sleeve of approximate overall dimension of 2"×1"×0.8" maintained at a temperature of about 37° C., that a satisfactory level of available power was about 3.5 watts. Once thermal equilibrium is reached, however, only about 0.5 watts is necessary to maintain the temperature.

As indicated above, the invention comprises electronics for stabilizing the temperature of a crystal which is held in a rotatable support block and partially covered with a heating sleeve. Accordingly, the dynamic temperature response is dependent on a variety of parameters such as mass of the material being heated, thermal conductivities, temperature differences, measurement time constants, etc. Generally the best dynamic response can most easily be obtained by determining values for circuit components empirically with the complete system operating. In this manner the time constant of the lead network can be experimentally matched to the characteristics of the other components that affect the dynamic response without identifying every component contributing to the dynamic response. A lead circuit time constant of about seven seconds was found to be suitable for use with a crystal included in an OPO.

Specific components which are available commercially and which can be used in the practice of the invention are given in table I below. It is noted, however, that many other combinations of circuit values suitable to carry out the objects of this invention, are possible and are known to those of ordinary skill in the art.

TABLE I

| Component | Identification |
|---|---|
| resistor 9 | 47 ohm |
| thermistor 12 | 10 kohm @ 25° C. |
| resistor 28 | 7.196 kohm, 1% |
| resistor 22, 24 | 1 megohm |
| resistor 34 | 193.8 kohm, 1% |
| capacitor 33 | 7.5 microfarads |
| resistor 42 | 3.9 kohm |
| resistor 44 | 100 kohm |
| transistor 48 | TIP-112 |
| resistor 50 | 4.7 ohm, 5 watt |
| resistor 52, 54 | 21.8 kohm, 1% |
| Op Amps 40, 46 | TLO-82, Texas Ins. Inc. |
| Op Amp 20 | OP-27, Analog Devices |

CALIBRATION EXAMPLE

Figure 4:
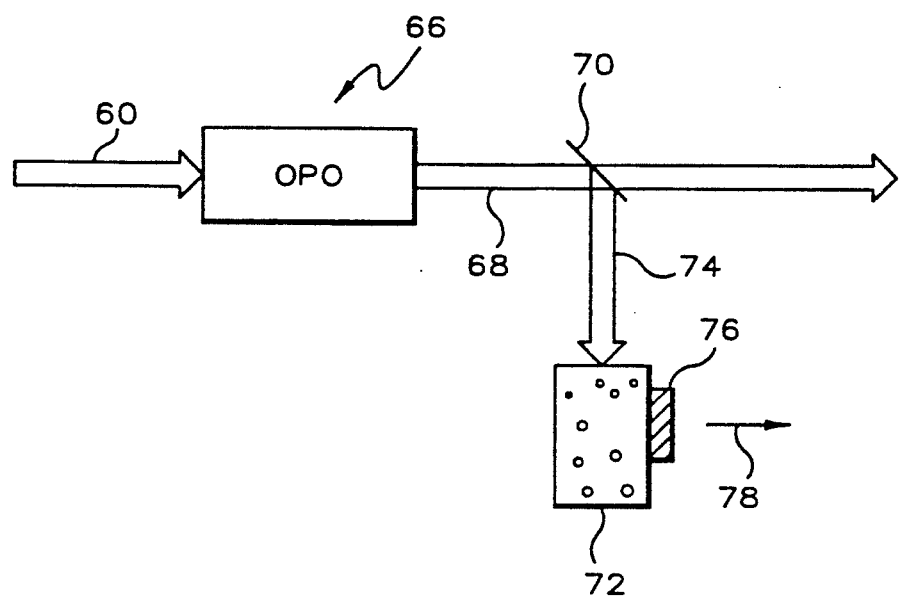
FIG. 4 is a simplified schematic illustration of the wavelength calibration of the OPO.

Referring now to FIG. 4, there is illustrated the basic flow of the infrared light beam used to calibrate the temperature controller of the present invention. The OPO which includes the temperature controller of this invention is illustrated generally at 66. The OPO requires as its pump radiation source a neodymium ion laser which employs neodymium ions in an yttrium aluminum garnet (YAG) host rod (not illustrated). With the arrrangement of components as shown in FIG. 4, it is desired to produce a tunable wavelength signal in the 3-5 micrometer range. This is accomplished in the output beam 68 with only the laser pump radiation 60 supplied to the OPO crystal. A splitter 70 directs a portion of the output beam 68 to a photoacoustic (PAC) cell 72, via the infrared beam 74, to determined its wavelength.

Figure 5:
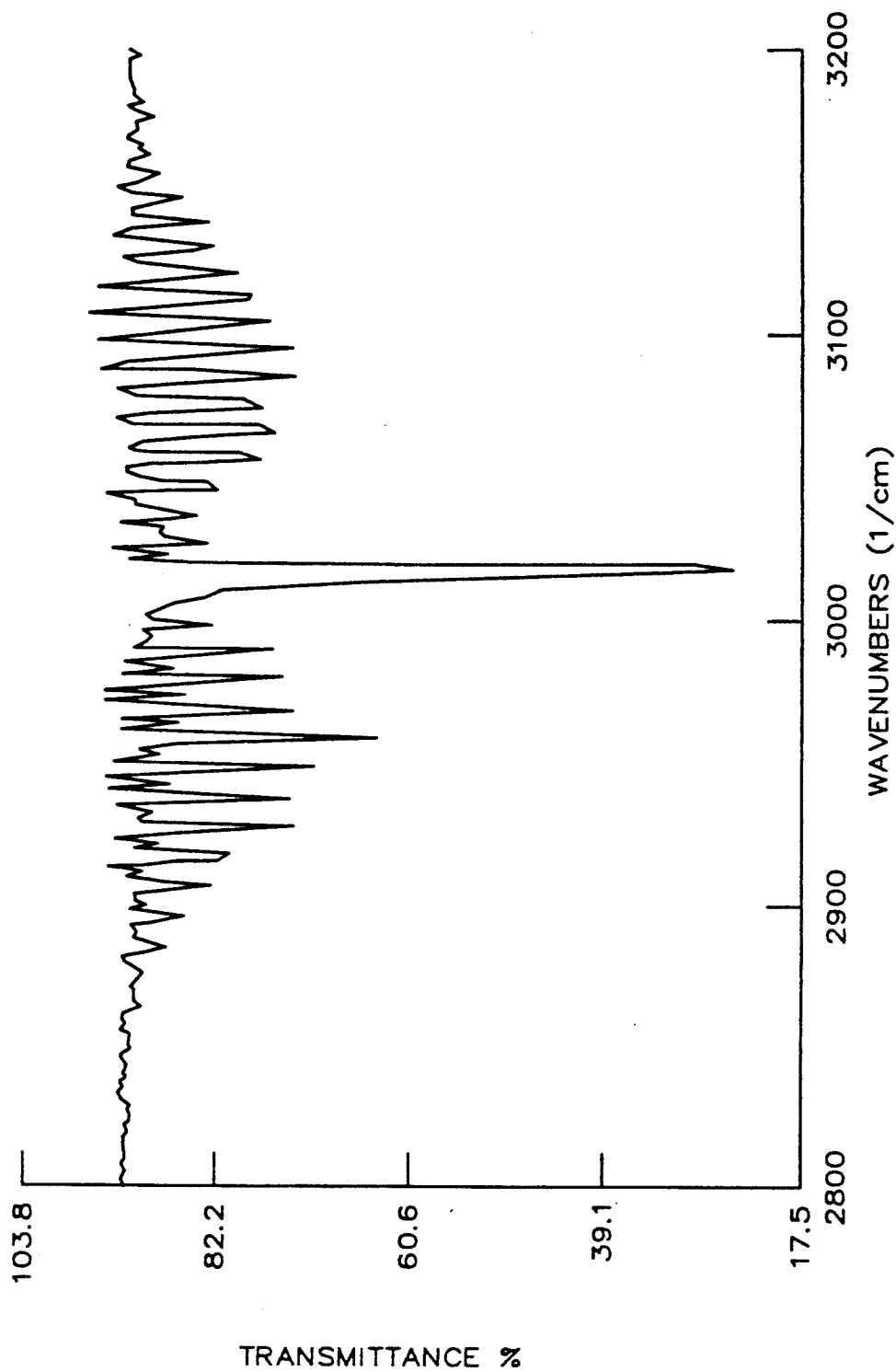
FIG. 5 shows a methane infrared absorption spectra.

When the wavelength of the infrared of the infrared beam is coincident with an absorbing peak of a gas in the PAC, localized heating of the gas occurs resulting in pressure variations on the attached microphone 76 and this produces an electrical signal 78 proportional to the energy being absorbed. An absorption for methane gas is illustrated in FIG. 5. Accordingly, the signal of the PAC cell versus position of a stepper motor provides an infrared absorption spectrum which can be compared to the actual spectrum of a gas as a function of wave number, as in FIG. 5, and one can relate a wave number of stepper motor position.

Figure 6:
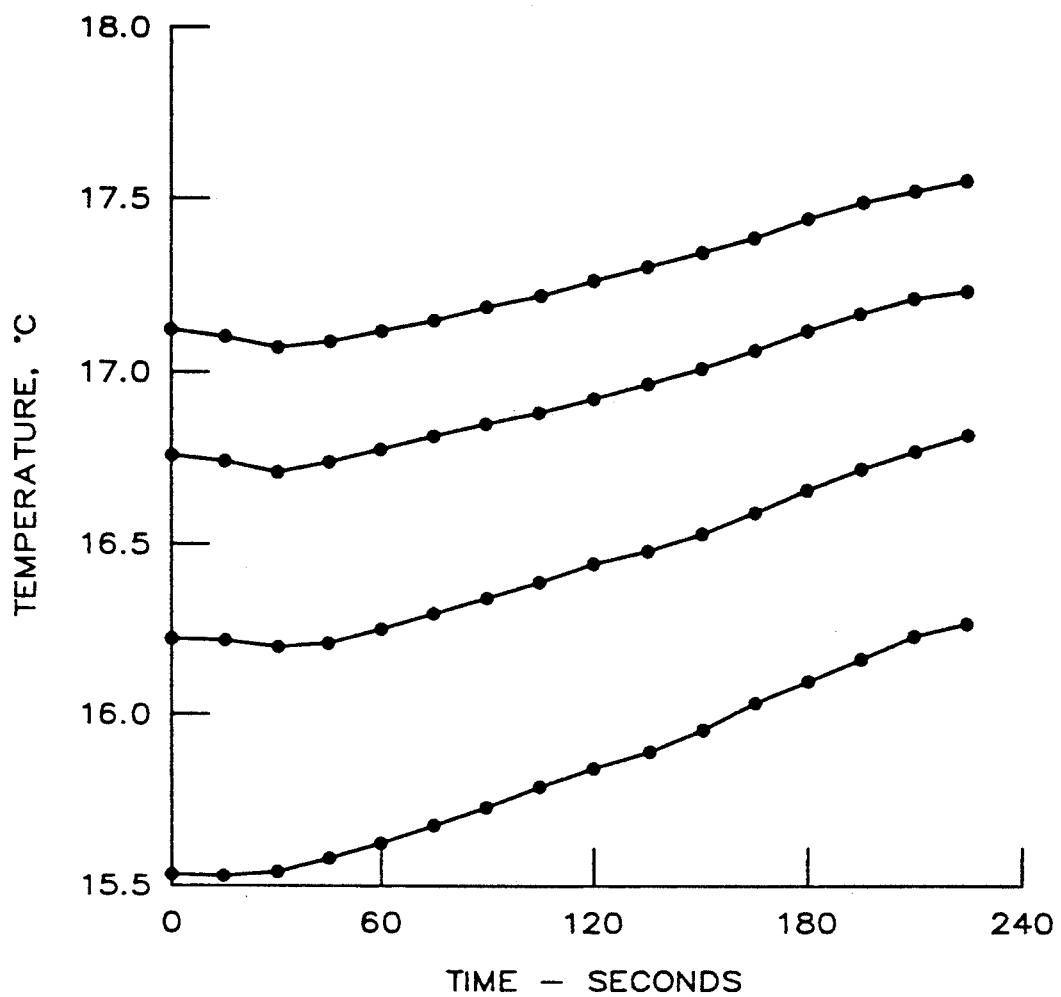
FIG. 6 is a graph showing temperature variation of the OPO without temperature control of the OPO crystal.
Figure 7:
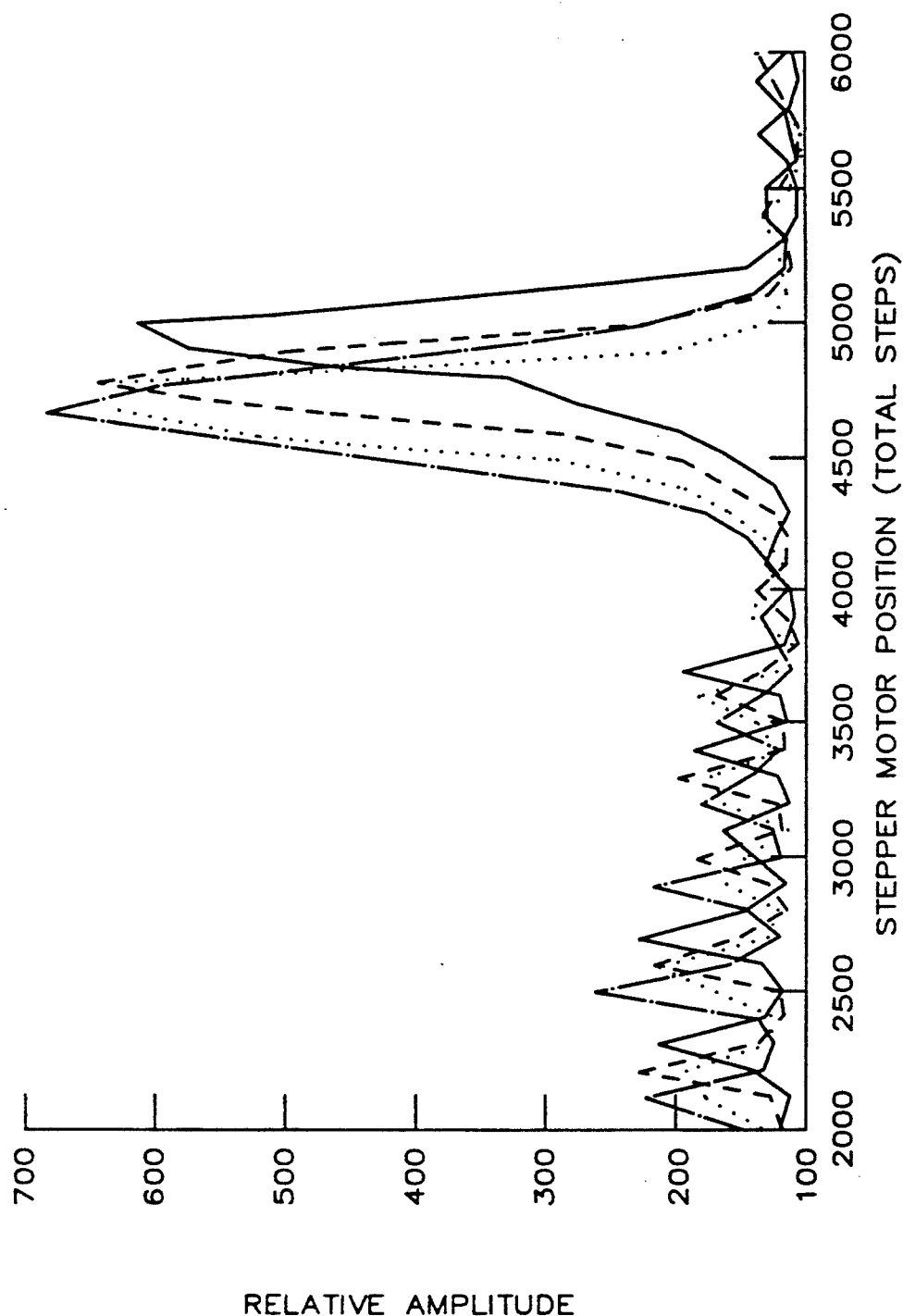
FIG. 7 is a graph illustrating spectra movement for four methane calibration runs made without temperature control of the OPO crystal.

To test the effectiveness of the temperature controller, the OPO was operated as a laser pulsing rate of 10 Hertz but without the temperature controller. The temperature of the crystal was monitored by measuring the resistance of the thermistor embedded in the heating sleeve, Four spectrum runs were made about 45 seconds apart, which included rotating the OPO crystal sufficiently to produce infrared light over the range of methane absorption of 3.0–3.5 micrometers. During each run of the temperature was recorded every 15 seconds. The results are illustrated in FIG. 6 and FIG. 7, and these results show a self heating effect occurring, with the temperature rising over 0.5° C. during a four minute calibration run as shown in FIG. 6. The rising temperature affected the methane spectrum shown in FIG. 7, where spectrum shifts, which correlate well with the self heating effect, are illustrated.

Figure 8:
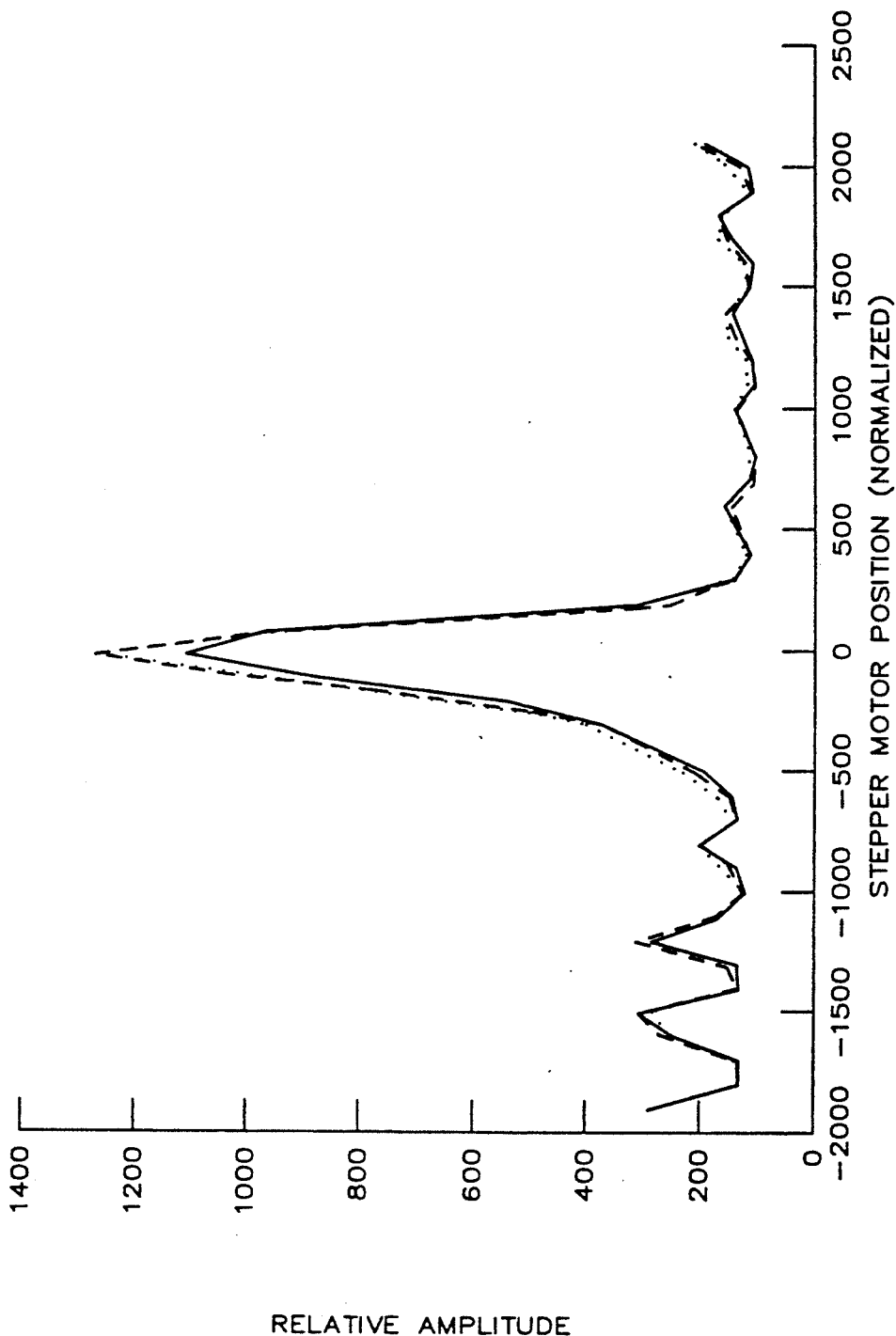
FIG. 8 is a graph illustrating spectra stability for four methane calibration runs employing temperature control according to this invention.

The controller was then turned on for a period of about 15 minutes for temperature stabilization. Three more runs were made with the temperature controller on. These results are illustrated in FIG. 8, and show exceptionally good alignment for the methane peaks for the three runs. The temperature change was less than 0.01° C. during each of the three runs.

While the invention has been described in terms of the presently preferred embodiment, reasonable variations and modifications are possible by those skilled in the art, and such variations and modifications are within the scope of the described invention.

That which is claimed is:

1. A method of controlling temperature of a crystal mounted in a rotatable support, said method comprising:
   thermally coupling said crystal and its rotatable support to a heating sleeve having a heating element, wherein the coupling is accomplished in such a way that the crystal is still free to rotate;
   connecting an electronic controller to said heating element; and
   matching the dynamic response of said electronic controller and the dynamic temperature characteristics of the combination of components including said heating sleeve, said crystal and said rotatable support.

2. A method in accordance with claim 1 wherein said electronic controller includes a voltage comparator section, a voltage gain section, a power amplifier section and a compensating lead network and wherein said step of matching the dynamic response of said electronic controller and the dynamic temperature characteristics of the combination of components comprises:
   determining the values of voltage gain, power gain and a time constant for said lead network while said controller is operatively connected to said heating element.

3. A method in accordance with claim 2 wherein said time constant for said lead network is about seven seconds.

4. A method in accordance with claim 3 wherein said heating sleeve is constructed of aluminum and has overall dimensions of about 2"×1"×0.8", and the available power for heating said heating sleeve is about 3.5 watts said method additionally comprising:
   maintaining the temperature of said crystal substantially above ambient temperature.

5. A method of generating tunable infrared radiation in the 3–5 micrometer range in an optical parametric oscillator employing a crystal mounted in a rotatable support, said method comprising:
   surrounding at least 3 faces of said crystal with a heating sleeve having a heating element in such a way that the crystal is still free to rotate;
   connecting an electronic controller to said heating element;
   matching the dynamic response of said electronic controller with the dynamic temperature characteristics of the combination of components including said heating sleeve, said crystal and said rotatable support;
   pumping said crystal by a laser operating substantially at 1.064 micrometers in a direction substantially normal to the optic axis of said crystal to produce shifted infrared light in the 3–5 micrometer range; and
   turning the frequency of said shifted infrared light by adjusting the mechanical angle at which the incoming laser light strikes the crystal.

6. A method in accordance with claim 5 wherein said electronic controller includes a voltage comparator section, a voltage gain section, a power amplifier section and a compensating lead network and wherein said step of matching a dynamic response of said electronic controller and the dynamic temperature characteristics of the combination of components comprises:
   determining the values of voltage gain, power gain and a time constant for said lead network while said controller is operatively connected to said heating element.

7. A method in accordance with claim 6 wherein said time constant for the lead network is about seven seconds.

8. A method in accordance with claim 7 wherein said heating sleeve is constructed of aluminum and has overall dimensions of about 2"×1"×0.8", and the available power for heating said heating sleeve is about 3.5 watt said method additionally comprising:
   maintaining the temperature of said crystal substantially above ambient temperature.

9. Apparatus for controlling the temperature of a crystal mounted in a rotatable support, said apparatus comprising:
   a generally rectangular heating sleeve having a slot for mating with at least 3 faces of said rotatable support;
   a heating element embedded in said heating sleeve;
   a thermistor embedded in said heating sleeve;
   an electronic controller for connecting to said heating element and said thermistor, said controller having a dynamic response characteristics matched to the dynamic temperature characteristics of the combination of components including said crystal, said rotatable support and said heating sleeve.

10. Apparatus in accordance with claim 9 wherein said controller comprises a voltage comparator section, a voltage gain section, a power amplifier section and a compensating lead network.

11. Apparatus in accordance with claim 10 wherein said lead network includes a resistor and a capacitor electrically connected in parallel and having component values for providing a time constant for said lead network of about seven seconds.

12. Apparatus in accordance with claim 11 wherein said crystal is a lithium niobate crystal employed in an optical parametric oscillator for generating infrared radiation in the 3–5 micrometer range.

13. Apparatus in accordance with claim 12 additionally comprising:
   a laser light transmitting infrared radiation at a wavelength of 1.064 micrometers; and
   means for pumping said crystal with said laser light in a direction substantially normal to the optic axis of said crystal to produce radiation in the three-five micrometer range.

14. Apparatus in accordance with claim 13 additionally comprising:
   means for rotating said crystal wherein the wavelength of infrared radiation in the 3-5 micrometer range is tuned by adjusting the mechanical angle at which the incoming laser light strikes said crystal.

15. Apparatus in accordance with claim 9 wherein said heating sleeve comprises an aluminum channel having overall dimensions of about 2"×1"×0.8", and said heating element comprises a plurality of electrically series connected resistors.

* * * * *